US010785748B2

(12) United States Patent
Artuso

(10) Patent No.: US 10,785,748 B2
(45) Date of Patent: Sep. 22, 2020

(54) MOBILE DEVICE ASSISTED SELECTION OF PAGING LOCATION AREA IN A WIRELESS COMMUNICATION NETWORK

(71) Applicant: T-Mobile USA, Inc., Bellevue, WA (US)

(72) Inventor: Daniel Frank Artuso, Concord, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/046,637

(22) Filed: Jul. 26, 2018

(65) Prior Publication Data
US 2020/0037286 A1  Jan. 30, 2020

(51) Int. Cl.
*H04W 68/00* (2009.01)
*H04W 68/02* (2009.01)
*H04W 60/04* (2009.01)

(52) U.S. Cl.
CPC .......... *H04W 68/02* (2013.01); *H04W 60/04* (2013.01)

(58) Field of Classification Search
USPC ............ 455/419, 435.1, 452.2; 370/328, 332
See application file for complete search history.

(56) References Cited

U.S. PATENT DOCUMENTS

| 6,101,388 | A | * | 8/2000 | Keshavachar | ........ | H04W 60/04 455/435.1 |
| 10,623,900 | B2 | * | 4/2020 | Garcia | .................. | H04W 4/029 |
| 2008/0081636 | A1 | * | 4/2008 | Nylander | .............. | H04W 48/04 455/452.2 |
| 2011/0090872 | A1 | * | 4/2011 | Dahlen | ............. | H04W 36/0022 370/332 |
| 2012/0015655 | A1 | * | 1/2012 | Lee | ......................... | H04W 8/02 455/435.1 |
| 2015/0156622 | A1 | * | 6/2015 | Shi | ......................... | H04W 4/12 370/328 |
| 2016/0142855 | A1 | * | 5/2016 | Yu | .......................... | H04W 4/70 455/419 |
| 2016/0286523 | A1 | * | 9/2016 | Yu | .......................... | H04W 68/02 |

* cited by examiner

*Primary Examiner* — David Q Nguyen
(74) *Attorney, Agent, or Firm* — Lee & Hayes, P.C.

(57) ABSTRACT

A technique of selecting a location area for paging of a mobile device in the wireless communication network is described herein. The technique includes registering the mobile device with a first cell within the wireless communication network, where the cell is included within a primary location area and one or more secondary location areas. The technique also includes determining a default location area index for the mobile device, where the default location area index identifies a default location area for the mobile device. The technique further includes receiving an indication from the mobile device to change from the default location area index to a secondary location area index. The secondary location area index identifies a secondary location that at least includes a sub-portion of the primary location area.

20 Claims, 6 Drawing Sheets

MOBILE DEVICE ASSISTED SELECTION OF PAGING LOCATION AREA IN A WIRELESS COMMUNICATION NETWORK

BACKGROUND

In recent years, mobile telecommunication devices have advanced from offering simple voice calling services within wireless communication networks to providing users with many new features. Mobile telecommunication devices now provide messaging services such as email, text messaging, and instant messaging; data services such as internet browsing; media services such as storing and playing a library of favorite songs; location services; and many others. In addition to the new features provided by the mobile telecommunication devices, users of such mobile telecommunication devices have greatly increased.

A large problem with paging mobile devices in wireless communication networks from the wireless communication networks' perspective is the inefficiency in the paging method. Generally, too many cells are being paged within paging location areas or Location Areas (LAs) to locate a single mobile device. This can cause undue loading in the core (e.g., a mobility management entity (MME) in Long Term Evolution (LTE) Networks) due to the excess paging messages.

Currently, in wireless communication networks each cell is assigned to a single LA (or Tracking Area (TA) in LTE networks). With only one LA assigned to a cell, every mobile device utilizes this static assignment. A primary premise of a good LA design is to balance the trade-off between the number of paging messages sent versus the number of LA update messages received (or Tracking Area Update (TAU) messages in LTE networks) so as not to overload the core. Thus, with the current paradigm of paging mobile devices via a single static LA assigned to a cell, not only can this cause excessive paging messages for poorly designed LAs, but it limits the possibilities for dynamically and automatically assigning a LA.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
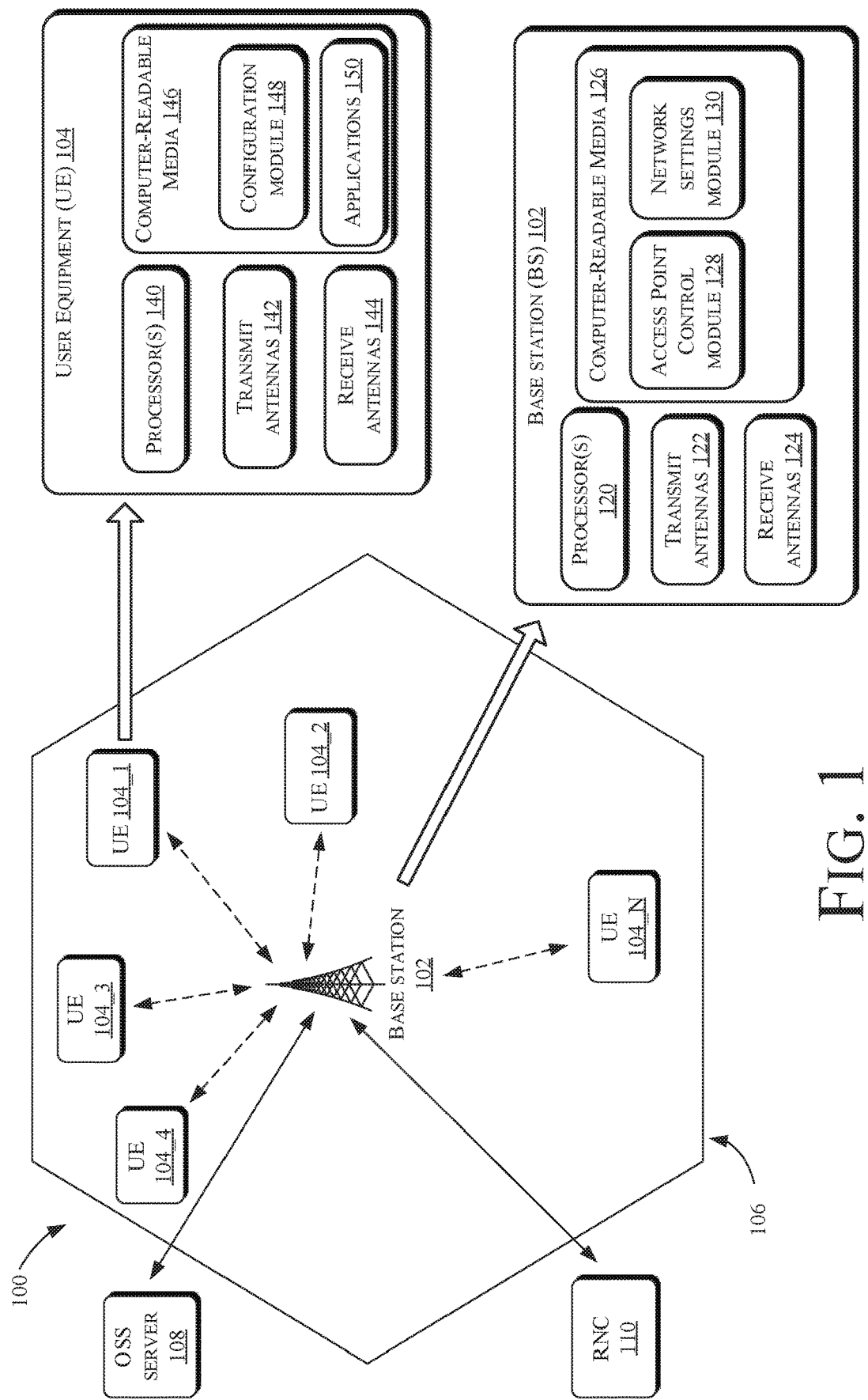
FIG. 1 schematically illustrates an example of a wireless communication network, in accordance with various configurations.

Described herein is a wireless communication network that includes techniques and architecture wherein each cell of the wireless communication network can have multiple Location Areas (LAs) (referred to collectively as the LA list and individually as the LA index). Both the primary LAs and the secondary LAs can include multiple cells. In accordance with configurations herein, the first LA index starts at zero and is the primary LA. LA Indexes of one and higher are assigned to the secondary LA indices.

In a configuration, primary LAs are defined and include cells of the wireless communication network, with each primary LA having a LA index of 0. Secondary LAs are also defined and include cells of the wireless communication network. Secondary LAs may be wholly contained within a primary LA or may overlap multiple LAs, with each secondary LA having a LA index of 1 or higher.

When a mobile device registers with the wireless communication, a core of the wireless communication network, e.g., a mobility management entity (MME), checks with a Home Subscriber Server (HSS) for the mobile device's default LA index. If the default index is not zero, then the MME will inform the mobile device of the default LA index. If the mobile device does not have a default index, then the mobile device will be assigned the primary LA. Most mobile devices will be defaulted to an LA index of zero, which refers to a primary LA.

The mobile device can be informed as to the LAs that are included within each cell. As the mobile device moves among the cells, the mobile device can inform the core, e.g., the MME, as to which LA index should be used for paging the mobile device. The mobile devices can wait until a trigger mechanism occurs, which may be based upon the mobile device, the cell, the core, or any other mechanism, that may cause the mobile device to select a different LA index.

Thus, in configurations, the mobile device can be assigned to one of a plurality of LAs per cell based upon information provided to the mobile device from the core and can selectively be assigned based on an operator of the wireless communication network assigning a LA index identifying a secondary LA. The assignment of the LA index identifying a secondary LA can also be based upon, in addition to or instead of the operator of the wireless communication network, some actions by the mobile device, the cell, the core or any other device or method in the wireless communication network that can trigger the wireless communication network to reassign a LA for the mobile device to temporarily utilize before reverting back to the primary LA.

Thus, for example, for mobile devices traveling on a highway or train, from the user's perspective, the user knows the exact path of the journey. However, from the wireless communication network's perspective, the journey is not known. By having the mobile device "inform" the core on its prospective journey (indirectly informing based on the operator's assignment of cells in the secondary LA) as it moves from cell to cell, the core can assign a secondary LA Index (which may contain fewer cells for paging purposes and hence less loading on the core). Additionally, for mobile devices within a massive, but confined, structure (e.g., large malls, stadiums, airports, etc.), there can be many cells serving such a location. With current paging schemes that page the last known cell of the mobile device, the mobile device may no longer be idling on that cell. Thus, the second page attempt will be for the entire LA, e.g., paging multiple cells, which is an inefficient mechanism. By having secondary locations including several but fewer cells, more efficient paging may be achieved.

FIG. 1 schematically illustrates an example wireless communication network 100 (also referred to herein as network 100). The network 100 comprises a Base Station (BS) 102 communicatively coupled to a plurality of user devices or user equipment, referred to as User Equipment (UE) 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102.

In a configuration, the UEs 104_1, . . . , 104_N may comprise any appropriate devices, e.g., portable electronic devices or mobile devices, for communicating over a wireless communication network. Such devices include stationary devices, mobile telephones, cellular telephones, Internet Protocol (IP) telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications. While UEs, mobile devices and subscriber for service from the wireless communication network 100 may technically be different, as used herein UEs, mobile devices and subscriber for service from the wireless communication network 100 have the same meaning.

In a configuration, the BS 102 may communicate voice traffic and/or data traffic with one or more of the UEs 104_1, . . . , 104_N using RF signals. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Time Division Multiple Access (TDMA), Universal Mobile Telecommunications System (UMTS), Evolution-Data Optimized (EVDO), Long Term Evolution (LTE), New Radio (NR), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipments, e.g., an Operation Support Subsystem (OSS) server 108, a core or Radio Network Controller (RNC) 110, and/or the like. In configurations, the RNC 110 can also be in the form of a Mobility Management Entity (MME) that serves as a gateway when the wireless communication network 100 operates according to the LTE standard or LTE Advanced standard, as will be discussed further herein.

In a configuration, the base station 102 may comprise processor(s) 120, one or more transmit antennas (transmitters) 122, one or more receive antennas (receivers) 124, and computer-readable media 126. The processor(s) 120 may be configured to execute instructions, which may be stored in the computer-readable media 126 or in other computer-readable media accessible to the processor(s) 120. In some configurations, the processor(s) 120 are a Central Processing Unit (CPU), a Graphics Processing Unit (GPU), or both CPU and GPU, or any other sort of processing unit. The base station 102 can also be in the form of, for example, a Node B (where the wireless communication network 100 is 3G UMTS network), in the form of an eNode B (where the wireless communication network 100 operates according to the LTE standard or LTE Advanced standard), in the form of a gNodeB (where the wireless communication network 100 operates according to the 5G standard), etc.

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In a configuration, the antennas 122 and 124 may be included in a transceiver component of the BS 102.

The computer-readable media 126 may include Computer-Readable Storage Media ("CRSM"). The CRSM may be any available physical media accessible by a computing device to implement the instructions stored thereon. CRSM may include, but is not limited to, Random Access Memory ("RAM"), Read-Only Memory ("ROM"), Electrically Erasable Programmable Read-Only Memory ("EEPROM"), flash memory or other memory technology, Compact Disc Read-Only Memory ("CD-ROM"), Digital Versatile Discs ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processor(s) 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other configurations, the access point control module 128, the network settings module 130, and one or more other modules (not illustrated), may be stored in another component of the network 100 (e.g., other than the BS 102). For example, one or more of these modules may be stored in a computer-readable media included in the OSS server 108, the RNC 110, another appropriate server associated with the network 100, and/or the like.

Although not illustrated in FIG. 1, various other modules (e.g., an operating system module, Basic Input/Output Systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In a configuration, the UEs 104 may comprise processor(s) 140, one or more transmit antennas (transmitters) 142, one or more receive antennas (receivers) 144, and computer-readable media 146 in the form of memory and/or cache. The processor(s) 140 may be configured to execute instructions, which may be stored in the computer-readable media 146 or in other computer-readable media accessible to the processor(s) 140. In some configurations, the processor(s) 140 is a Central Processing Unit (CPU), a Graphics Processing Unit (GPU), or both CPU and GPU, or any other sort of processing unit. The one or more transmit antennas 142 may transmit signals to the base station 102, and the one or more receive antennas 144 may receive signals from the base station 102. In a configuration, the antennas 142 and 144 may be included in a transceiver component of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several modules, such as instructions, data stores, and so forth that are configured to execute on the processor(s) 140. For instance, the computer-readable media 146 may store a configuration module 148. In configurations, the computer-readable media 146 may also store one or more applications 150 configured to receive and/or provide voice, data and messages (e.g., Short Message Service (SMS) messages, Multi-Media Message Service (MMS) messages, Instant Messaging (IM) messages, Enhanced Message Service (EMS) messages, etc.) to and/or from another device or component (e.g., the base station 102, other UEs, etc.). The applications 150 may also include third-party applications that provide additional functionality to the UE 104.

Although not illustrated in FIG. 1, the UEs 104 may also comprise various other components, e.g., a battery, a charging unit, one or more network interfaces, an audio interface, a display, a keypad or keyboard, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processor(s), one or more transmit antennas, one or more receive antennas, and computer-readable media including a configuration module.

In a configuration, the network settings module 130 stored in the computer-readable media 126 maintains a plurality of network settings associated with the network 100. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a Transmit Time Interval (TTI) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In a configuration, one or more of the plurality of network settings maintained by the network settings module 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

Figure 2:
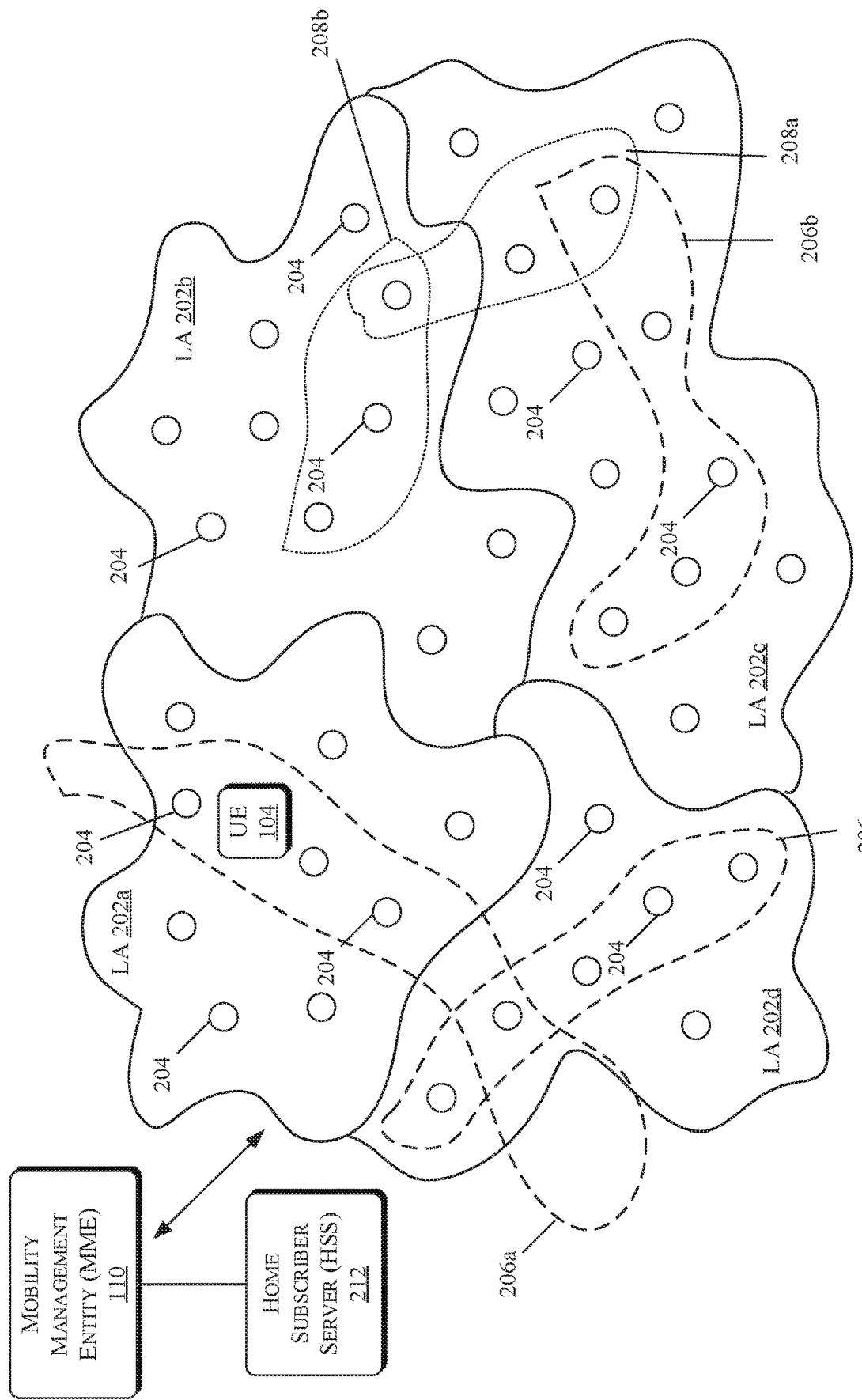
FIG. 2 schematically illustrates a portion of the wireless communication network of FIG. 1 arranged in multiple primary location areas and secondary location areas, in accordance with various configurations.

FIG. 2 schematically illustrates a portion of a wireless communication network 100 arranged in multiple primary Location Areas (LAs) 202a-d. While only four primary LAs 202a-d are illustrated, the wireless communication network 100 may include more or fewer primary LAs 202 depending on the size and configuration of the wireless communication network 100. Each primary LA 202 includes multiple cells 204, e.g., macro cells 106. In the example illustration of FIG. 2, each cell 204 is represented by a circle that may represent a cell 106. Additionally, multiple secondary LAs 206a-c and tertiary LAs 208a and b are also illustrated. The tertiary LAs 208 are actually secondary LAs as used herein but are identified separately for explanation purposes.

As can be seen, secondary LAs 206 and tertiary LAs 208 may overlap primary LAs 202, or may be located entirely within a primary LA 202. As can be seen, the secondary LAs 206 and tertiary LAs 208 may include fewer cells 204. In configurations, although not illustrated, secondary LAs 206 and tertiary LAs 208 may also include more cells 204 than a primary LA 202. In configurations, more or fewer secondary LAs 206 and tertiary LAs 208 may be included. Additionally, there may be more levels or layers of LAs than primary, secondary and tertiary LAs, e.g., fourth, fifth, sixth, etc.

In the example configuration of FIG. 2, the wireless communication network 100 is configured as an Evolved Universal Mobile Telecommunications System (UMTS) Terrestrial Radio Access Network (E-UTRAN) and thus, each base station 102 is configured as an E-UTRAN node B, also known as an Evolved Node B, (eNodeB). In the example configuration of FIG. 2, the wireless communication network 100 further includes a Home Subscriber Server (HSS) 212 and a UE 104 is illustrated within the wireless communication network 100. The primary LAs 202, the secondary LAs 206 and the tertiary LAs 208 are thus, generally referred to as Tracking Areas (TAs) 202, 206 and 208, respectively. For simplicity, the Tracking Areas are referred to herein as Location Areas (LAs). The example configuration of FIG. 2 includes additional elements and UEs 104 that are not illustrated for clarity purposes.

When there is an incoming connection from the wireless communication network 100 for the UE 104, the cells 204 of the LA 202, e.g., LA 202a, within which the UE 104 is located send paging messages for the UE 104. When the UE 104 is within a secondary LA 206 (e.g., secondary LA 206a) in addition to the primary LA 202a, the UE 104 can inform the MME 110 to switch the paging location for the UE 104 to the secondary LA 206a. Thus, the MME 110 only needs to send paging messages from the cells 204 contained within the secondary LA 206a rather than to all LAs within the primary LA 202a.

In particular, each LA 202, 206 and 208 is identified by a LA index. In configurations, each primary LA 202 may be part of a LA index that may be identified as LA index 0 and each secondary LA 206 may be part of a LA index that may be identified as LA index 1 or higher, and each tertiary LA 208 may be part of a LA index that may be identified as LA index 2 or higher. Each cell 204 includes a LA list that identifies the LAs 202, 206 and 208 within which the cell 204 is located. As previously noted, there may be more levels or layers of LAs included, e.g., a fourth level, a fifth level, etc., than just primary LAs 202, secondary LAs 206 and tertiary LAs 208.

In configurations, when the UE 104 registers with the wireless communication network 100, the MME 110 fetches the UE's default LA index from the HSS 212 and then sends a message to the UE 104 to inform the UE 104 which LA index to use, if the UE's default LA index is not 0. Otherwise the UE 104 will default to LA index 0, which includes a primary LA 202 that includes the cell 204 with which the UE 104 registers with the wireless communication network 100, e.g., LA 202a. Thus, in the example of FIG. 2, unless the UE 104 has a default index, the UE 104 will default to LA index 0 and thus, for paging purposes, at least initially, be paged by the cells 204 within the LA 202a.

When the UE 104 registers with or attaches to a cell 204 of the wireless communication network 100, the UE 104 can be informed as to the LAs 202, 206, 208 that include each cell 204. As the UE 104 moves among the cells 204, the UE 104 can inform the MME 110 with LA update messages (e.g., Tracking Area Update (TAU) messages) as to which LA 202, 206, 208 should be used for paging the UE 104 by providing the appropriate LA index. In general, secondary LAs 206 may include fewer cells 204 than the primary LAs 202, e.g., the secondary LAs 206 include subsets of the primary LAs 202, and thus, paging of the UE 104 within the secondary LAs 206 can be more efficient. Additionally, as the UE 104 moves among and within the secondary LAs 206, fewer LA update messages (e.g., TAU messages) may be required to be sent by the UE 104 to the MME 110. Likewise, tertiary LAs 208 may include fewer cells 204 than the secondary LAs 206 and/or the primary LAs 202, e.g., the tertiary LAs 208 include subsets of the secondary LAs 206 and/or primary LAs 202, and thus, paging of the UE 104 within the tertiary LAs 208 can be more efficient. The UE 104 can wait until a trigger event occurs, which may be based upon the UE 104, the cells 204, the MME 110, or any other mechanism, that may cause the UE 104 to select a different LA index.

For example, a trigger event may be designated as occurring when the UE 104 informs the wireless communication network 100 that the UE 104 wants to be assigned to a different LA, e.g., a secondary 206 since the primary LA 202 is the default LA. The UE 104 knows the available secondary LAs 206 and tertiary LAs 208 since the cell 204 with which the UE 104 registers informs the UE 104 of all configured LAs 202, 206 and 208 (primary, any secondary LAs and any tertiary LAs) via an SIB 1 message. Such informing occurs every time a UE 104 is being served by a new cell 204, e.g., every time the UE 104 registers with or attaches to a cell 204.

The UE 104 determines which secondary LAs 206 (and any available tertiary LAs 208) are configured that include the cell 204 that provided the LAs 202, 206 and 208 to the UE 104. The UE 104 maintains a LA History Table in its memory. The UE 104 maintains an attribute corresponding to each LA received. A formula may be used to determine whether a trigger event is needed. The formula is applied to each LA index received, e.g., 0, 1, 2, etc. From the perspective of the MME 110, each LA index may encompass multiple LAs, e.g., multiple LAs 202, 206, 208, etc. For example, the primary LAs 202 may be part of an LA index that is identified as Index 0. Index 0 thus, in the present example, encompasses four (or more unillustrated) primary LAs, e.g., LAs 202a, 202b, 202c and 202d. The secondary LAs 206 may be part of an LA index identified as Index 1. Index 1 thus, in the present example, encompasses three (or more unillustrated) secondary LAs, e.g., LAs 206a, 206b and 206c. The tertiary LAs 208 may be part of an LA index identified as Index 2. Index 2 thus, in the present example, encompasses two (or more unillustrated) tertiary LAs, e.g., LAs 208a and 208b. However, from the perspective of each cell 204 and each UE 104, each LA index only encompasses one LA. For example, a cell 204 located in primary LA 202d and secondary LA 206c will have a primary LA index (Index 0) that identifies LA 202d and a secondary LA index (Index 1) that identifies secondary LA 206c. Likewise, a UE 104 that registers with or attaches to such a cell 204 will have a primary LA index (Index 0) that identifies LA 202d and a secondary LA index (Index 1) that identifies secondary LA 206c.

When secondary LAs 206 (and possibly tertiary LAs 208) are defined, X=MAX(MIN(X+1, LA change count threshold, 0), where the LA count threshold represents the number of times the UE 104 registers with or attaches to a new cell 204 that contains the same LA index, e.g., Index 1 and/or Index 2 is being sent by the wireless communication network 100 to the UE 104 when registering with or attaching to a new cell 204. In configurations, X is a whole number greater than 0. When no secondary LAs 206 (and thus, no tertiary LAs 208) are defined, X=MAX(MIN(X−1, LA change count threshold, 0). In such an example, X can only range from 0 to the LA change count threshold.

Once any one of the secondary LA indices in the LA history table reaches the LA change count threshold, the UE 104 then selects the higher priority LA index (if there are more than one LA index that met the condition) to inform the MME 110 of a LA change for the UE 104. Note, the LA index having the smallest value has the highest priority, e.g., Index 1 has a higher priority than Index 2. In particular, for this example, the following four conditions need to be met to cause a trigger event, e.g., a changing of LA index:

i. LA index of 1 and higher, e.g., secondary LAs (and possibly tertiary LAs) are defined;

ii. X>=LA change count threshold;

iii. Current LA index is different than the LA Secondary indices being sent in the SIB 1 message; and iv. Time since the last LA change is greater than a LA time change threshold (to avoid quick changes back and forth). If this fourth condition is not met, wait predetermined amount of time and then check again.

Thus, in summary, if the UE 104 sees the same LA Secondary index (e.g., Index 1=206c) in X consecutive SIB 1 messages, the UE 104 triggers an event to inform the wireless communication network 100, e.g., the MME 110, to switch to Index 1 (e.g., secondary LA 206c) and use the secondary LA, e.g., secondary LA 206c, that includes the current cell 204 to which the UE 104 is attached. As previously noted, X represents the LA count threshold and may be defined by an operator of the wireless communication network 100.

In a configuration, the UE 104 may inform the MME 110 to revert back to LA index 0, e.g., the primary LAs 202, if X=a LA revert count threshold. The LA revert count threshold may be a predefined threshold defined by the operator of the wireless communication network 100. Additionally, in a configuration, the UE 104 may inform the MME 110 to revert back to LA index 0, e.g., the primary LA 202, when X is less than the LA change count threshold, but a predetermined amount of time has expired. For example, the operator of the wireless communication network 100 may set a predefined time limit after which the UE 104 should revert back to a LA index 0.

Once the UE 104 informs the MME 110 of a LA change, the MME 110 may confirm the LA change with the UE 104. The MME may also inform the HSS 208 of the LA change.

Accordingly, as can be seen, in configurations the UE 104 can be assigned to one of a plurality of LAs 202, 206 and 208 that include a particular cell 204 based upon information provided by the UE 104 to the MME 110. The UE 104 can be informed as to the LAs 202, 206 and 208 that include each cell 204 when the UE 104 registers for service with a new cell 204. As the UE 104 moves among the cells 204, the UE 104 can inform the MME as to which LA 202, 206 and 208 should be used for paging the UE 104, as previously described. In general, since the secondary LAs 206 and tertiary LAs 208 include fewer cells 204 than the primary LAs 202, e.g., the secondary LAs 206 and tertiary LAs 208 include subsets of the primary LAs 202, paging of the UE 104 within the secondary LAs 206 and the tertiary LAs can be more efficient. Additionally, as the UE 104 moves among and within the secondary LAs 206 and tertiary LAs 208, fewer LA update messages (e.g., TAU messages) may be required to be sent by the UE 104. The UE 104 can wait until a trigger event occurs, which may be based upon the UE 104, the cells 204, the MME 110, or any other mechanism, that may cause the UE 104 to select a different LA index.

Figure 3:
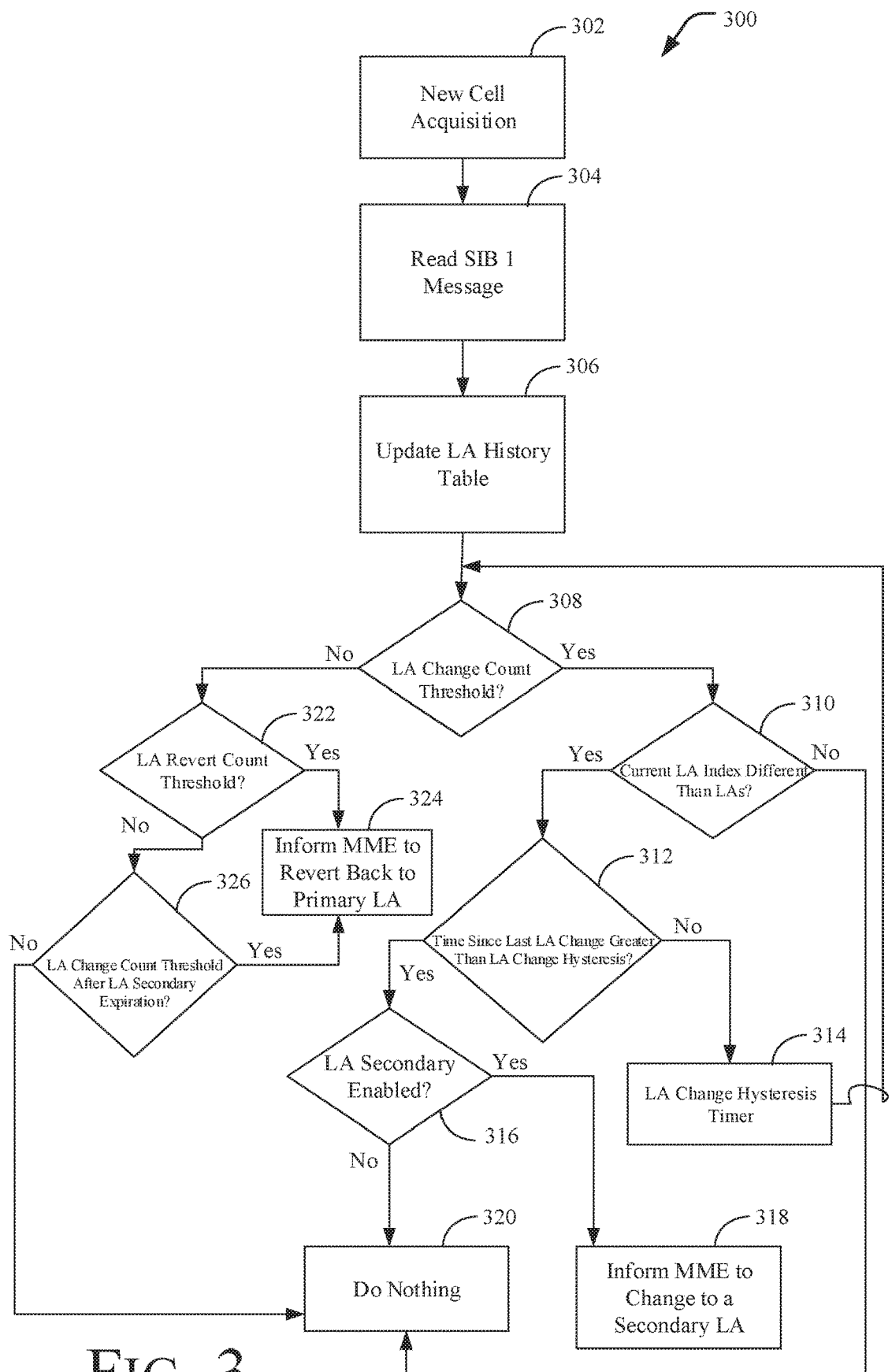
FIG. 3 is a flowchart illustrating a method of using a trigger event to change a location area for paging of a mobile device in the wireless communication network of FIG. 1, in accordance with various configurations.
Figure 4:
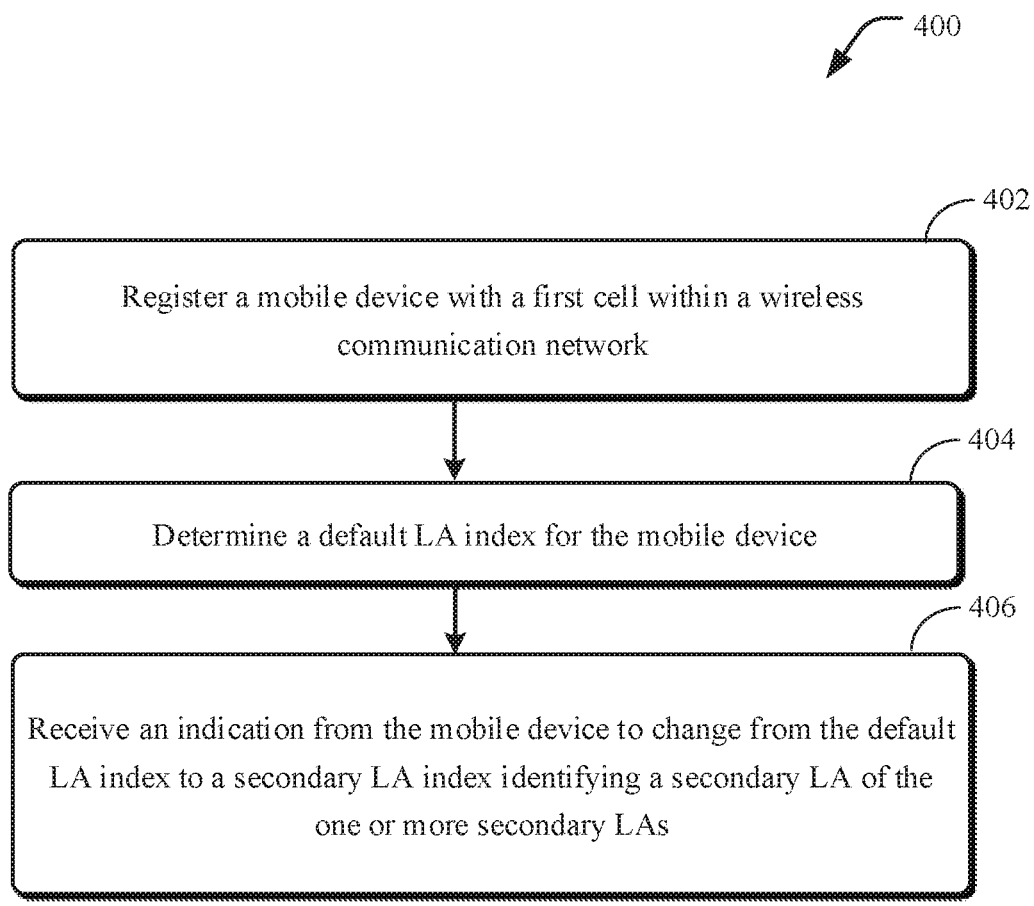
FIG. 4 is a flowchart illustrating a method of selecting a location area for paging of a mobile device in the wireless communication network of FIG. 1, in accordance with various configurations.

FIGS. 3 and 4 are flow diagrams of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 3 is a flowchart illustrating an example method 300 of using a trigger event to change a location area for paging of a mobile device, e.g., a UE 104, in a wireless communication network, e.g., wireless communication network 100. A trigger event occurs when the UE informs the wireless communication network that the UE wants to be assigned to a different LA, e.g., a LA 202, 206 or 208. At block 302, a UE acquires or registers for service with a new cell, e.g., cell 204. At block 304, the cell 204 informs the UE of all configured and/or defined LAs (primary and any secondary's), via a SIB 1 message. This operation occurs every time the UE is being served by a new cell. The UE reads the SIB 1 message and determines which secondary LAs (including tertiary LAs, which are also secondary LAs) are configured in the cell from the list of LAs received by the UE in the SIB 1 message. At block 306, the UE updates a LA history table by incrementing or decrementing the LAs in the LA history table, which is an array attribute that is maintained in the UEs memory.

At block 308, once any one of the secondary LAs listed in the LA history table reaches the attribute LA change count threshold, the UE selects the higher priority LA (if there are more than one LAs that meet the condition) to inform the MME, e.g., the MME 110, of a LA change. The desired change may be accomplished by, at block 310, determining if a current LA index is different than selected LAs. If yes, then the method 300 proceeds to block 312, where it is determined if the time since the last LA change is greater than a LA change hysteresis. The LA change hysteresis is used to keep the UE from continually changing among LAs. If the time since the last LA change is greater than the LA change hysteresis, then the method 300 proceeds to block 316 where it is determined if secondary LAs are enabled. If not, then the method 300 proceeds to block 320 and does nothing, e.g., the UE remains with the currently assigned LA, e.g., a primary LA 202. If at block 310, the current LA index is different than LAs, or is not different than current LAs, then the method 300 proceeds from block 310 to block 320 and does nothing.

If secondary LAs are enabled, then the method 300 proceeds from block 316 to block 318 and informs the MME to change to a secondary LA. If the time since the last LA change is not great than the LA change hysteresis, then the method 300 proceeds from block 312 to block 314, where the LA change hysteresis timer continues to run and the method 300 returns to block 308.

If the LA change count threshold attribute is not reached in the LA history table, then the method 300 proceeds from block 308 to block 322 to determine if a LA revert count threshold has been reached. If yes, then the method proceeds to block 324 and informs the MME to revert back to a primary LA. If the LA revert count threshold has not been reached, then the method 300 proceeds from block 322 to block 326 to determine if the LA change count threshold is less after the LA secondary expiration. If yes, then the method 300 proceeds from block 326 to block 324 and informs the MME to revert back to a primary LA. For example, the operator of the wireless communication network 100 may set a predefined time limit after which the UE 104 should revert back to a LA index 0. If not, then the method 300 proceeds from block 326 to block 320 and does nothing.

FIG. 4 is a flow diagram illustrating an example method 400 of selecting a location area for paging of a mobile device, e.g., a UE 104, in a wireless communication network, e.g., wireless communication network 100. As illustrated, at block 402, the mobile device registers with a first cell within the wireless communication network. For example, the UE 104 may register with a first cell 204 of the wireless communication network 100. At block 404, a default LA index is determined for the mobile device. For example, a default LA index is determined for the UE 104. In configurations, the default LA index may identify a default primary LA 202 or a default secondary LA 206 for the UE 104. For example, the default LA 202 may consist of one of (i) the primary LA 202 or (ii) one of one or more secondary LAs 206. Each of the one or more secondary LAs 206 may include at least a sub-portion of the primary LA 202. At block 406, an indication is received from the mobile device to change from the default LA index to a secondary LA index identifying a secondary LA of the one or more secondary LAs. For example, the indication may be received by the MME 110 from the UE 104. The indication may inform the MME 110 to change UE 104 from the default LA index to a secondary LA index that identifies a secondary LA 206 of the one or more secondary LAs 206.

Thus, using the architecture and techniques described herein can improve efficiencies with paging mobile devices within a wireless communication network. As previously noted, since the secondary LAs generally include fewer cells than the primary LAs, e.g., the secondary LAs include subsets of the primary LAs, paging of mobile devices within the secondary LAs can be more efficient. Additionally, as mobile devices move among and within the secondary LAs, fewer LA update messages may be required to be sent by mobile devices.

Figure 5:
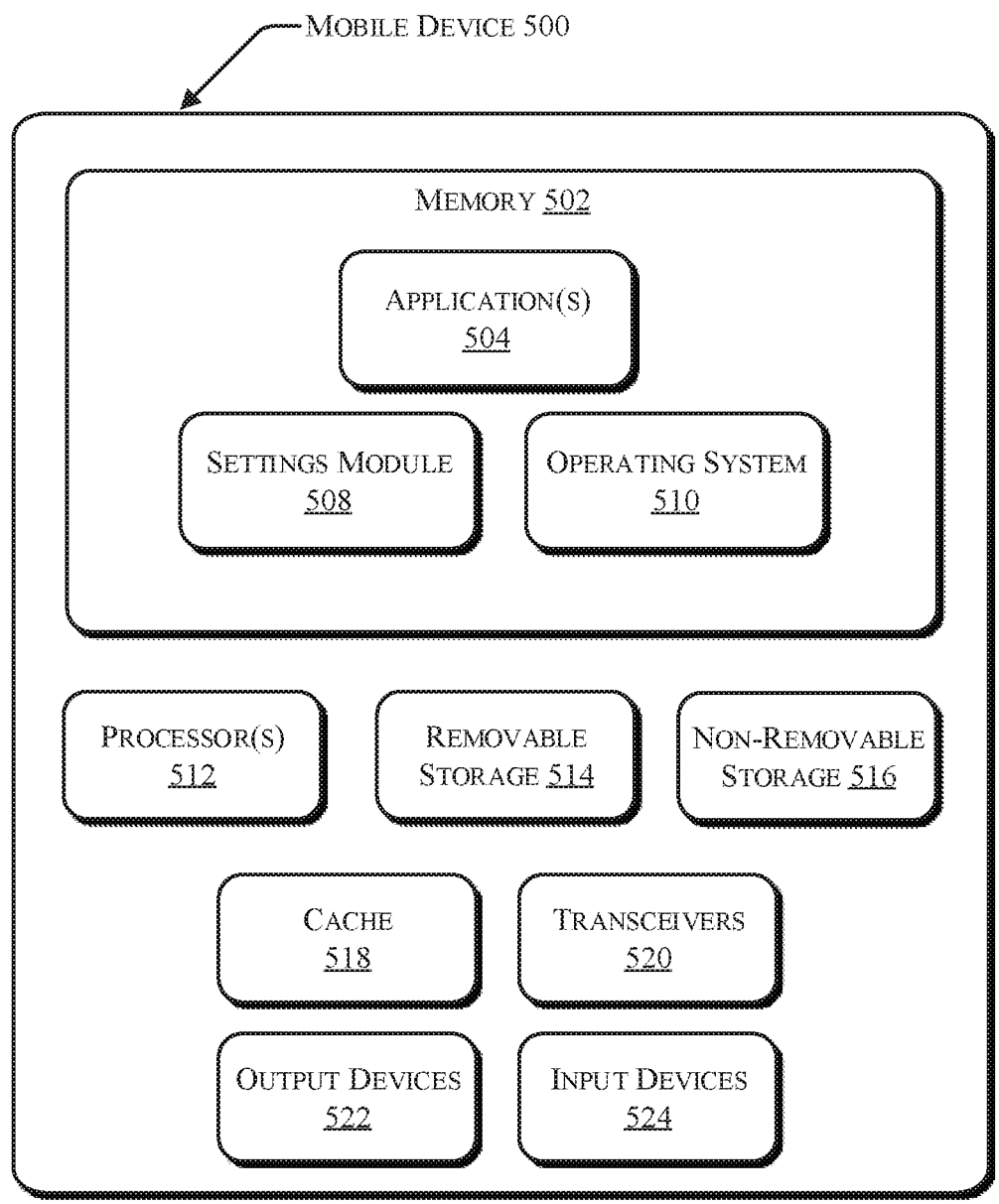
FIG. 5 schematically illustrates a component level view of an example mobile device configured for use in the wireless communication network of FIG. 1, in accordance with various configurations.

FIG. 5 schematically illustrates a component level view of a mobile device 500, such as UE 104, configured to function within wireless communication network 100. As illustrated, the mobile device 500 comprises a system memory 502, e.g. computer-readable media 146, storing application(s) 504, e.g., applications 150 from FIG. 1, a settings module 508, and an operating system 510. Also, the mobile device 500 includes processor(s) 512, a removable storage 514, a non-removable storage 516, cache 518, transceivers 520, output device(s) 522, and input device(s) 524. In various implementations, system memory 502 is volatile (such as RAM), non-volatile (such as ROM, flash memory, etc.) or some combination of the two. In some implementations, the processor(s) 512 is a central processing unit (CPU), a graphics processing unit (GPU), or both CPU and GPU, or any other sort of processing unit.

The mobile device 500 may also include additional data storage devices (removable and/or non-removable) such as, for example, magnetic disks, optical disks, or tape. Such additional data storage may include removable storage 514 and non-removable storage 516.

Non-transitory computer-readable media may include volatile and nonvolatile, removable and non-removable tangible, physical media implemented in technology for storage of information, such as computer readable instructions, data structures, program modules, or other data. System memory 502, removable storage 514, non-removable storage 516 and cache 518 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the mobile device 500. Any such non-transitory computer-readable media may be part of the mobile device 500. The processor(s) 512 may be configured to execute instructions, which may be stored in the non-transitory computer-readable media or in other computer-readable media accessible to the processor(s) 512.

In some implementations, the transceivers 520 include any sort of transceivers known in the art. For example, the transceivers 520 may include a radio transceiver that performs the function of transmitting and receiving radio frequency communications via an antenna. Also, or alternatively, the transceivers 520 may include wireless modem(s) to may facilitate wireless connectivity with other computing devices. Further, the transceivers 520 may include wired communication components, such as an Ethernet port, for communicating with other networked devices.

In some implementations, the output devices 522 include any sort of output devices known in the art, such as a display (e.g., a liquid crystal display), speakers, a vibrating mechanism, or a tactile feedback mechanism. Output devices 522 also include ports for one or more peripheral devices, such as headphones, peripheral speakers, or a peripheral display.

In various implementations, input devices 524 include any sort of input devices known in the art. For example, input devices 524 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 524 may be used to enter preferences of a user of the mobile device 500 to define how the user wishes certain calls from third parties to be handled by the wireless communication network, as previously described herein.

Figure 6:
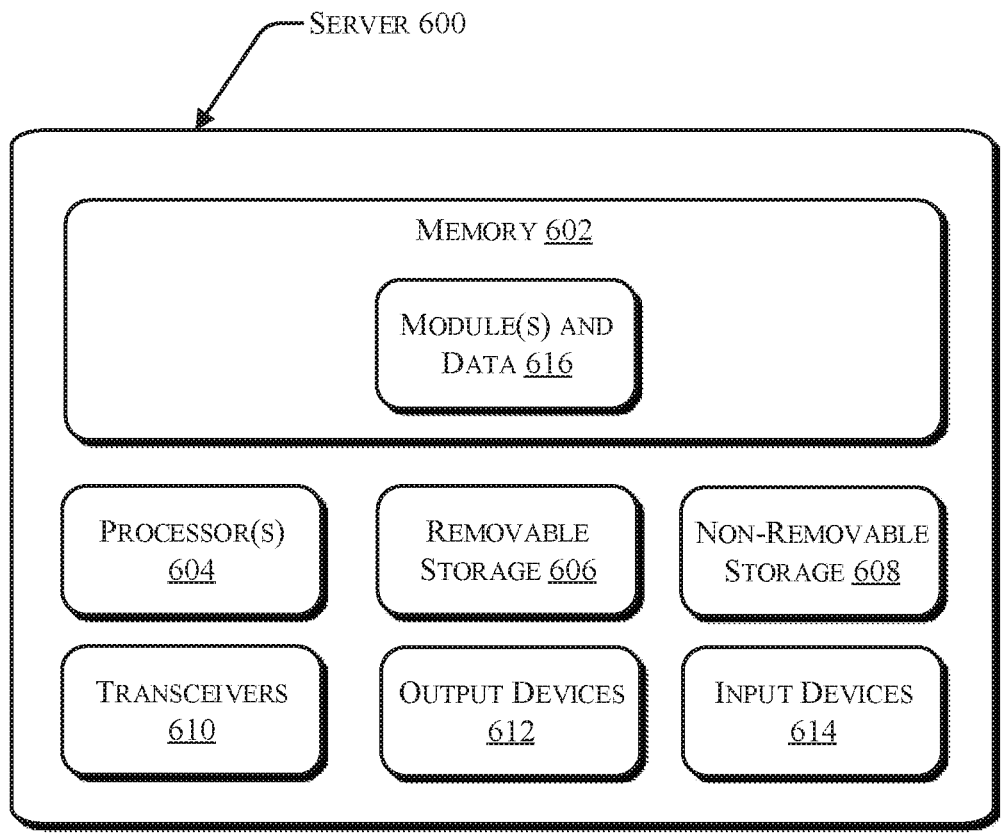
FIG. 6 schematically illustrates a component level view of a server configured for use in the wireless communication network of FIG. 1 to provide various services of the wireless communication network of FIG. 1, in accordance with various configurations.

FIG. 6 illustrates a component level view of a server 600 configured for use within a wireless communication network, e.g., wireless communication network 100 in order to provide various services within the wireless communication network, according to the techniques described herein. The server 600 may serve as the OSS server 108 or may be located in the RNC or gateway 110 of FIG. 1, e.g., one or more servers 600 may be configured to serve as a MME. As illustrated, the server 600 comprises a system memory 602 that may store data and one or more modules and/or applications 616 for interacting with mobile devices 600, e.g., UEs 104, as described herein. Also, the server 600 includes processor(s) 604, a removable storage 606, a non-removable storage 608, transceivers 610, output device(s) 612, and input device(s) 614.

In various implementations, system memory 602 is volatile (such as RAM), non-volatile (such as ROM, flash memory, etc.) or some combination of the two. In some implementations, the processor(s) 604 is a Central Processing Unit (CPU), a Graphics Processing Unit (GPU), or both CPU and GPU, or any other sort of processing unit.

The server 600 may also include additional data storage devices (removable and/or non-removable) such as, for example, magnetic disks, optical disks, or tape. Such additional storage is illustrated in FIG. 6 by removable storage 606 and non-removable storage 608. The one or more of the memory 602, the removable storage 606 and/or the non-removable 608 may include module(s) and data 616 (illustrated in the memory 602). The module(s) and data 616 may include instructions executable by, for example, the processor(s) 604.

Non-transitory computer-readable media may include volatile and nonvolatile, removable and non-removable tangible, physical media implemented in technology for storage of information, such as computer readable instructions, data structures, program modules, or other data. System memory 602, removable storage 606 and non-removable storage 608 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 600. Any such non-transitory computer-readable media may be part of the server 600.

In some implementations, the transceivers 610 include any sort of transceivers known in the art. For example, the transceivers 610 may include wired communication components, such as an Ethernet port, for communicating with other networked devices. Also, or instead, the transceivers 610 may include wireless modem(s) to may facilitate wireless connectivity with other computing devices. Further, the transceivers 610 may include a radio transceiver that performs the function of transmitting and receiving radio frequency communications via an antenna.

In some implementations, the output devices 612 include any sort of output devices known in the art, such as a display (e.g., a liquid crystal display), speakers, a vibrating mechanism, or a tactile feedback mechanism. Output devices 612 also include ports for one or more peripheral devices, such as headphones, peripheral speakers, or a peripheral display.

In various implementations, input devices 614 include any sort of input devices known in the art. For example, input devices 614 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method performed within a wireless communication network comprising a primary location area (LA) identified with a LA index, the primary LA comprising a plurality of cells, the method comprising:
registering a mobile device with a first cell within the wireless communication network;
determining a default LA index for the mobile device, the default LA index identifying a default LA for the mobile device, the default LA comprising a first secondary LA of one or more secondary LAs, wherein the first secondary LA includes at least a sub-portion of the primary LA;
receiving an indication from the mobile device to change from the default LA index to a secondary LA index identifying a second secondary LA of the one or more secondary LAs, wherein the first secondary LA includes at least a sub-portion of the second secondary LA and the indication is indicative of one or more actions by the mobile device, the sub-portion including at least a second cell located in both of the first secondary LA and the second secondary LA; and
changing, based at least in part on the indication received from the mobile device, from the default LA index for the mobile device to the secondary LA index.

2. The method of claim 1, further comprising:
causing cells within the one of (i) the first secondary LA or (ii) the second secondary LA to page the mobile device using only the cells located within the one of (i) the first secondary LA or (ii) the second secondary LA.

3. The method of claim 1, wherein receiving the indication from the mobile device to change from the default LA index to the secondary LA index comprises receiving the indication after the mobile device has registered with the second cell.

4. The method of claim 3, wherein receiving the indication after the mobile device has registered with the second cell comprises receiving the indication after the mobile device has registered with the second cell after a predetermined amount of time has elapsed.

5. The method of claim 1, further comprising receiving another indication from the mobile device to change from the secondary LA index to the primary LA index comprising receiving the another indication after the mobile device has registered with a third cell within the primary LA that is not located within the one of (i) the first secondary LA or (ii) the second secondary LA.

6. The method of claim 1, further comprising receiving another indication from the mobile device to change from the secondary LA index to the primary LA index comprising receiving the another indication after a predetermined amount of time has elapsed.

7. The method of claim 1, wherein the one or more actions by the mobile device comprises changing geographic location and moving from cell to cell.

8. The method of claim 1, wherein the first secondary LA and a third secondary LA both include at least one third cell of the plurality of cells.

9. A Mobility Management Entity (MME) within a wireless communication network comprising a primary location area (LA) identified with a LA index, the primary LA comprising a plurality of cells, the MME comprising:
one or more processors;
a non-transitory storage medium; and
instructions stored in the non-transitory storage medium, the instructions being executable by the one or more processors to:
register a mobile device with a first cell within the wireless communication network;
determine a default LA index for the mobile device, the default LA index identifying a default LA for the mobile device, the default LA comprising a first secondary LA of one or more secondary LAs, wherein the first secondary LA includes at least a sub-portion of the primary LA, the sub-portion including at least a second cell located in both of the first secondary LA and the primary LA; and
receive an indication from the mobile device to change from the default LA index to a secondary LA index identifying one of (i) the first secondary LA or (ii) a second secondary LA of the one or more secondary LAs, the indication being received after the mobile device has registered with the second cell within at least one of (i) the first secondary LA or (ii) the second secondary LA and being indicative of one or more actions by the mobile device; and change, based at least in part on the indication received from the mobile device, from the default LA index for the mobile device to the secondary LA index, wherein the first secondary LA and the second secondary LA both include the second cell of the plurality of cells.

10. The MME of claim 9, wherein the instructions are further executable by the one or more processors to:
cause cells within the one of (i) the first secondary LA or (ii) the second secondary LA to page the mobile device using only the cells located within the one of (i) the first secondary LA or (ii) the second secondary LA.

11. The MME of claim 9, wherein the instructions are further executable by the one or more processors to:
receive the indication after the mobile device has registered with the second cell after the mobile device has registered with the second cell after a predetermined amount of time has elapsed.

12. The MME of claim 9, wherein the instructions are further executable by the one or more processors to:
receive another indication from the mobile device to change from the secondary LA index to the LA index.

13. The MME of claim 12, wherein the instructions are further executable by the one or more processors to:
receive the another indication from the mobile device to change from the secondary LA index to the LA index by receiving the another indication after the mobile device has registered with a third cell within the primary LA that is not located within the one of (i) the first secondary LA or (ii) the second secondary LA.

14. The MME of claim 12, wherein the instructions are further executable by the one or more processors to:
receive the another indication from the mobile device to change from the secondary LA index to the LA index by receiving the another indication after a predetermined amount of time has elapsed.

15. A wireless communication network comprising:
a primary location area (LA) identified with a LA index, the primary LA comprising a plurality of cells; and
a Mobile Management Entity (MME), wherein the MME comprises:
one or more processors;
a non-transitory storage medium; and
instructions stored in the non-transitory storage medium, the instructions being executable by the one or more processors to:
register a mobile device with a first cell within the wireless communication network;
determine a default LA index for the mobile device, the default LA index identifying a default LA for the mobile device, the default LA comprising a first secondary LA of one or more secondary LAs, wherein the first secondary LA includes at least a sub-portion of the primary LA;
receive an indication from the mobile device to change from the default LA index to a secondary LA index identifying a second secondary LA of the one or more secondary LAs, wherein the first secondary LA overlaps at least a sub-portion of the second secondary LA and the indication is indicative of one or more actions by the mobile device, the sub-portion including at least a second cell located in both of the first secondary LA and the second secondary LA; and
change, based at least in part on the indication received from the mobile device, from the default LA index for the mobile device to the secondary LA index.

16. The wireless communication network of claim 15, wherein the instructions are further executable by the one or more processors to:
cause cells within the one of (i) the first secondary LA or (ii) the second secondary LA to page the mobile device using only the cells located within the one of (i) the first secondary LA or (ii) the second secondary LA.

17. The wireless communication network of claim 15, wherein the wireless communication network further comprises a Home Subscriber Server (HSS) and the instructions are further executable by the one or more processors to:
determine a default LA index for the mobile device by receiving the default LA index from the HSS.

18. The wireless communication network of claim 17, wherein the instructions are further executable by the one or more processors to:
provide the secondary LA index to the HSS.

19. The wireless communication network of claim 15, wherein the instructions are further executable by the one or more processors to:
receive the indication from the mobile device to change from the default LA index to the secondary LA index by receiving the indication after the mobile device has registered with the second cell.

20. The wireless communication network of claim 15, wherein the instructions are further executable by the one or more processors to:
receive another indication from the mobile device to change from the secondary LA index to the LA index.

* * * * *